(No Model.) 3 Sheets—Sheet 1.
C. ROSINE.
AUTOMATIC SCREW CUTTING MACHINE.
No. 471,194. Patented Mar. 22, 1892.
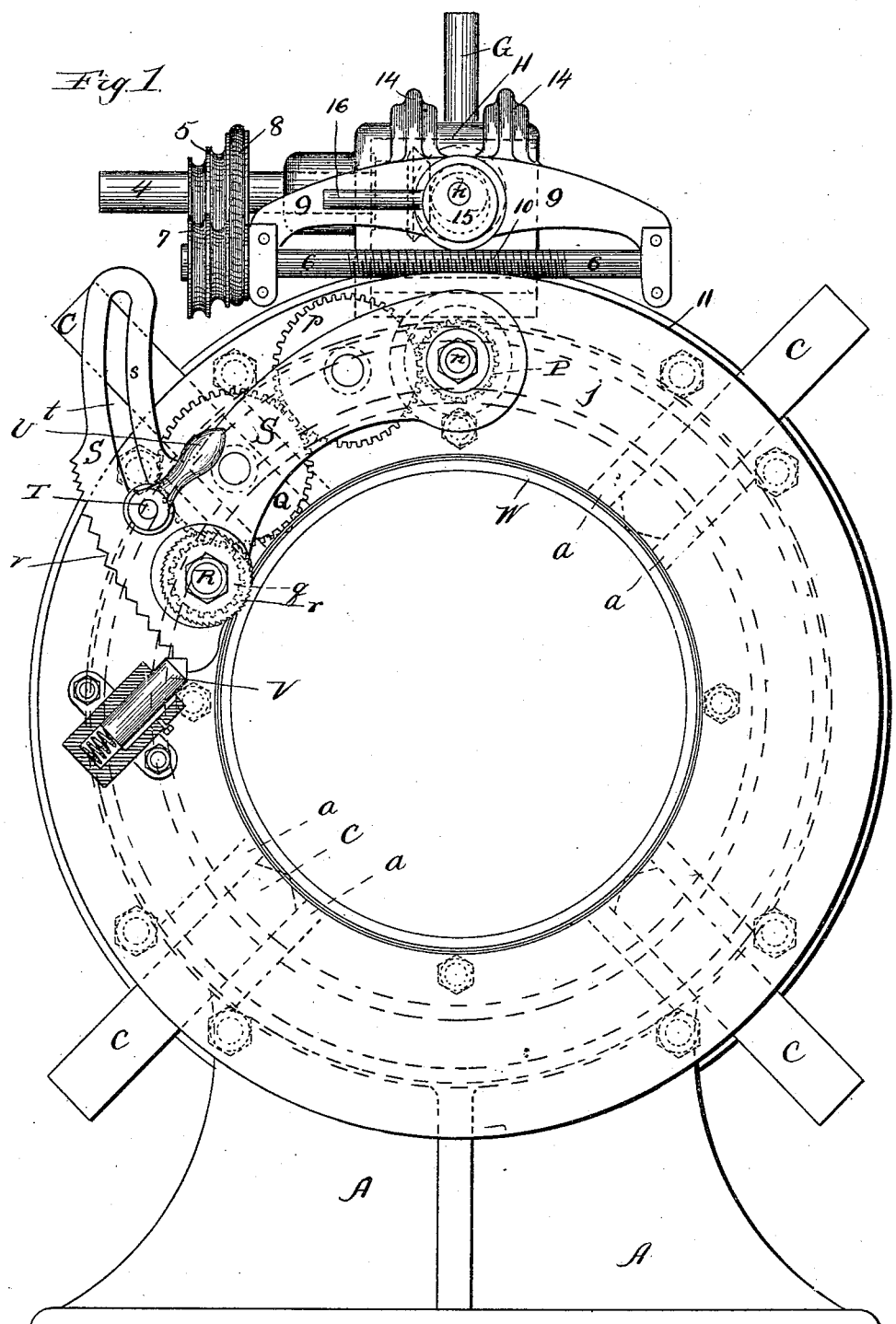
Witnesses:
Geo. E. Curtis
H. W. Munday
Inventor:
Conrad Rosine
By Munday Evarts & Adcock
His Attorneys.

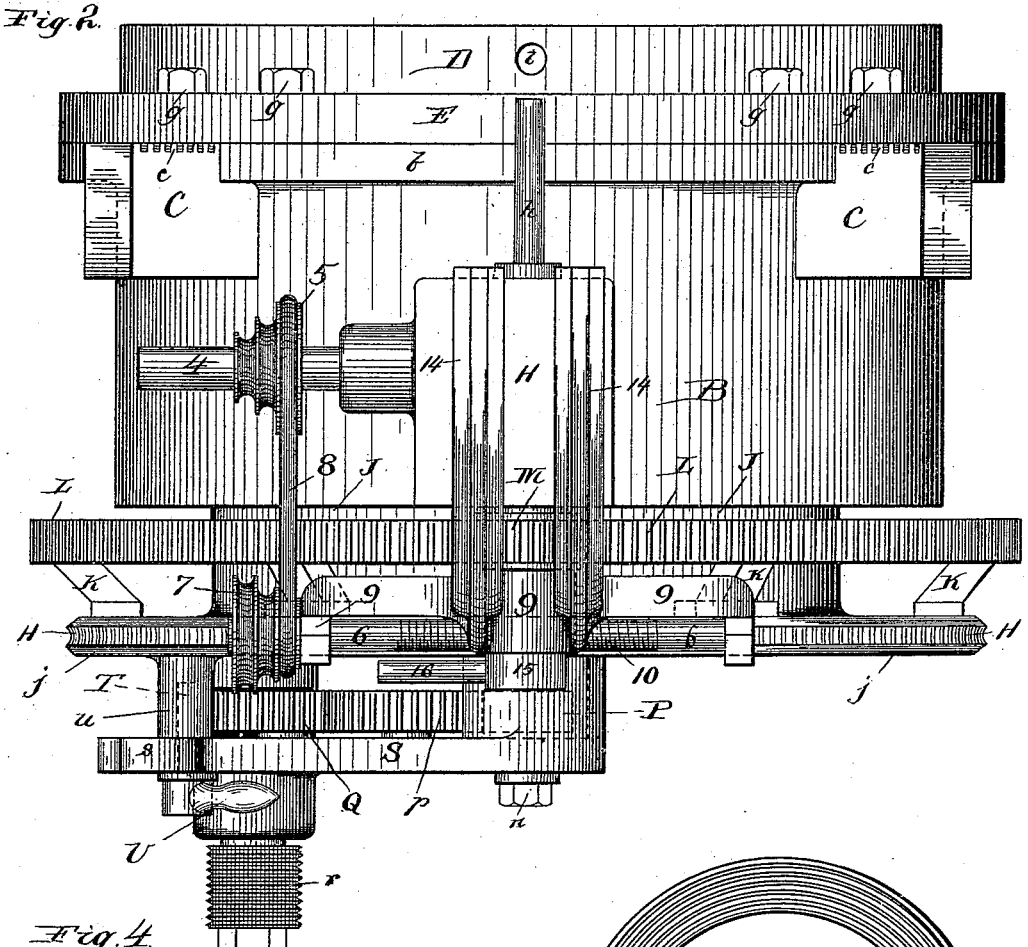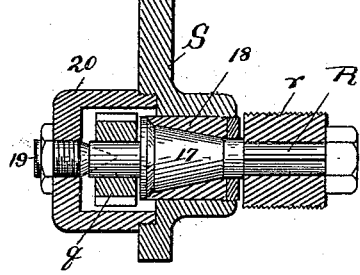

(No Model.) 3 Sheets—Sheet 3.

C. ROSINE.
AUTOMATIC SCREW CUTTING MACHINE.

No. 471,194. Patented Mar. 22, 1892.

Witnesses:
Lew. E. Curtis.
H. W. Munday

Inventor:
Conrad Rosine
By Munday Evarts & Adcock
his Attorneys.

UNITED STATES PATENT OFFICE.

CONRAD ROSINE, OF CHICAGO, ILLINOIS.

AUTOMATIC SCREW-CUTTING MACHINE.

SPECIFICATION forming part of Letters Patent No. 471,194, dated March 22, 1892.

Application filed June 23, 1890. Serial No. 356,406. (No model.)

*To all whom it may concern:*

Be it known that I, CONRAD ROSINE, a citizen of the United States, residing in Chicago, in the county of Cook and State of Illinois, have invented a new and useful Improvement in Automatic Thread-Cutting Machines, of which the following is a specification.

This invention relates to improvements in machines for cutting screw-threads upon pipes and other cylindrical-shaped articles.

The object had in view has been the production of a machine having a thread-cutter which is capable of cutting during a single circuit or travel around the pipe to be threaded all the threads, making up a continuous screw extending two or more times around the pipe, thereby greatly quickening and cheapening the operation of cutting such screw-threads. The machine has been devised more especially for the cutting of threads upon pipes of considerable size; but it is obviously adapted to be used with smaller pipes and cylinders. I employ in this machine a milling-cutter having a series of cutting ridges or ribs agreeing with the number of convolutions desired in the screw to be cut; and this cutter travels once around the pipe or other article to be threaded in a spiral path agreeing with the pitch desired for the screw. The machine embodies, also, a chuck or other means for gripping the pipe.

The invention consists, in the first place, of the combination, with means for gripping and holding the article to be threaded, of a milling-tool having a sufficient number of cutting-ridges to form the number of convolutions which are to be cut, said tool traveling once around the piece operated upon in a spiral path.

It further consists in the combination, with the chuck for holding the pipe, of a milling-tool adapted to cut all the desired convolutions at one operation, means for traveling said tool around the piece being cut in a spiral path, and means for rotating the tool continuously while traveling said path.

It further consists in the novel devices and novel combinations of devices hereinafter set forth, and pointed out in the claims.

In the drawings, Figure 1 is an end elevation of my improved machine. Fig. 2 is a plan thereof. Fig. 3 is a longitudinal vertical section. Fig. 4 is a detail view showing in section the milling-tool and its supporting-arbor. Fig. 5 shows the ring for adjusting the clamps of the chuck for gripping the pipe to be threaded, and Fig. 6 shows the face of said clamps which engages with the ring of Fig. 5.

In said drawings, A represents the bed of the machine, and B a stationary ring, which may be secured to or made integral with the bed. This ring forms the frame of the machine, and upon it the moving parts of the machine are supported.

W represents a section of piping, which is positioned in the machine ready for the operation of cutting a thread thereon. It is firmly held in position by a suitable chuck, which may consist of the radially-sliding dogs C, confined upon the vertical flange $b$ of ring B between guides $a$. These dogs are moved in and out in radial lines by the engagement therewith of the ring D, mounted upon ring B and provided upon one of its faces with the spiral thread $d$, such thread engaging with worm-teeth $c$ upon the ends of the dogs. The ring D is supported upon the frame-ring B by guide-rings E and $e$ and the cap-ring F, the latter setting over the shoulder $f$ of the screw-ring and being bolted by bolts $g$ to the frame-ring. The periphery of ring D is provided at intervals with openings $i$, adapted to receive an operating-lever G, whereby it may be turned in its supports, the dogs C being thereby moved in or out, as occasion demands.

Mounted upon the frame B is a casting H, wherein is formed a bearing for the main drive-shaft $h$. From this drive-shaft power is carried by mechanism hereinafter described to a rotatable ring-carrier J, supported upon the interior of the frame B. Said ring-carrier supports and carries the milling-tool, and it is provided with a vertical outer flange $j$, upon which are secured at intervals fixed brackets K. Encircling the carrier J and supported upon said brackets K is an annular or ring gear L, having teeth upon both its periphery and its interior face. The joint between this gear and the brackets is dovetail in form, so as to prevent all movement by the gear upon said brackets, except a rotating one, which is permitted by the fact that the brackets enter a continuous groove in the ring. This gear L is caused to rotate by the meshing with its exterior teeth of the gear M upon the drive-shaft. Said gear M has a spline connection to the drive-shaft; but for reasons hereinafter stated it should have a sliding movement thereon. The rotation thus given to the gear L actuates with its interior teeth the gear N upon the shaft $n$, said gear being preferably loose upon its shaft and driving the same, when actuated in one direction only, by means of the clutch O, which is forced into engagement with the gear by the spring $o$. Upon the shaft $n$ is also mounted rigidly a gear P, and this gear, through a train of gears $p$, Q, and $q$, gives motion to a shaft R, carrying the milling-tool $r$. This milling-tool, together with the gears $q$ Q, is supported in a swinging frame S, turning upon shaft $n$ as a pivot and enabling the positioning of the milling-tool in proper position to suit the diameter of the article being threaded, and also enabling it to be moved out of operative position whenever desired. An arm $s$, attached to this swinging frame, is provided with a curvilinear slot $t$, and through this slot passes a tightening-screw T, such screw being operated by the hand-lever U and entering a post $u$, located upon the flange $j$ of the ring-carrier. This screw enables me to lock the swinging mill-frame in any position desired. The edge of said mill-frame is also provided with teeth, as shown at $v$, which engage with an automatically-acting dog V and correctly position the milling-tool for the different diameters of piping, this dog and teeth thus acting as a gaging device to assist in the ready positioning of the milling-tool prior to its being locked by the tightening-screw T. It will be seen from the description thus far given that the mill will be continuously rotated during its travel around the pipe, and it is caused to thus travel around the pipe and at the same time to move in a spiral direction by the mechanism which I will now describe.

At 2 is a miter-gear upon the drive-shaft. This gear meshes with a similar gear 3 upon a shaft 4, extending at right angles from the drive-shaft and carrying a cone-pulley 5. From this pulley I drive a shaft 6, parallel to shaft 4, by means of the cone-pulley 7 and the belt 8. This shaft 6 is preferably supported in a movable bracket 9, and a portion of it is cut to form a worm 10, adapted to engage with the worm-gear 11, formed upon the outer edge of flange $j$. Through this engagement between 10 and 11 the mill-carrier J is rotated, and thereby made to carry the mill-tool around the pipe. This rotation of the carrier J is in a spiral path, owing to the threaded engagement of the bearing-ring 12 upon the periphery of the carrier J and a stationary ring 13, secured to the inner surface of frame B, the pitch of the thread upon said rings agreeing with the pitch desired in the thread to be cut. Of course these rings 12 and 13 may be made removable, so that others can be substituted for them if it is desired to cut a thread of different pitch. In this spiral movement the carrier moves to the right, as the parts are shown in Fig. 3, and it carries with it the annular gear and gives a sliding movement to the gear M, and said gear M moves the bracket 9 with it, so as to carry the worm-shaft 6 in such movement. Said bracket 9 is supported by arms 14, resting and having liberty to move in the direction of the drive-shaft upon the casting H.

When the thread has been cut, the milling-tool may be returned to its starting-point, and in order that this may be quickly done I provide means whereby the engagement between the worm 10 and the carrier may be temporarily suspended. These means are the following: The bracket 9 is connected to the drive-shaft $h$ by means of an eccentric 15, loosely journaled upon said shaft. This eccentric may be moved at will by the lever 16, which is fast therein, and by turning it through a partial revolution it lifts the bracket 9 and with it the worm, so as to terminate the engagement between the latter and the carrier. The carrier can now be rotated back to its starting-point quickly, and when it has reached that point the worm is again thrown into engagement therewith by returning the eccentric to its normal position, as shown at Fig. 1.

I prefer to provide the mill-journal R with a bearing, which will allow the taking up of wear, and for this purpose I form that portion of it shown at 17 in conical shape and locate said portion 17 in a correspondingly-shaped bearing 18 in the swinging frame. A set-screw 19 bears upon the end of journal R and forces the latter to bear against the taper of bearing 18, as illustrated at Fig. 4, said set-screw being supported in a yoke 20 rigid with the swinging frame.

The operation of the machine is substantially as follows: A pipe W or other cylindrical-shaped object is placed in the chuck and caused to be grasped by the dogs, the latter acting not only to grasp the pipe, but also to center it accurately, owing to the fact that they are moved inwardly against the pipe by the spirally-threaded ring D. The milling-tool having been accurately positioned to operate upon articles of the diameter of the pipe W by means of the engagement of the dog V with the teeth $v$ of the swinging frame and said swinging frame having been duly locked in such position, motion is given to the machine through the drive-shaft and the tool begins to rotate on its own axis in obedience to power carried to it from the rotating annular ring, and at the same time the carrier moves slowly around the pipe in a spiral path. The mill cuts all the grooves in passing once around the pipe which are necessary to form the entire screw, and these grooves by reason of its spiral movement are all united, so as to form one continuous convolution or screw upon the pipe. Upon the conclusion of the cutting the eccentric 15 is turned, thereby lifting the worm from its engagement with the mill-carrier, so that the latter can be rotated back to its starting-point readily. In this return movement there is no engagement between the clutch O and gear N, thus permitting the shaft n, the mill, and the intervening train of gearing to remain still during such movement.

The milling-tool r, in order to adapt it to the work designed for it in my machine, is provided with a series of annular cutting ridges or ribs running around its periphery, and these ridges are shaped so as to give the shape desired to the thread, and are also spaced so as to make the cuts at such intervals as will insure threads of the proper width. The pitch of the thread is determined, as already stated, by the path imparted to the carrier.

I claim—

1. The combination, with a support for the pipe or other article to be cut, of a milling-cutter rotating on its own axis, having a series of cutting ridges or ribs agreeing with the number of convolutions desired, and a carrier supporting said cutter and adapted to move once around the pipe in the spiral path, substantially as set forth.

2. The combination, with a support for holding the pipe, of a carrier moving around the pipe in a spiral path, guides for giving the spiral character to such movement, and a milling-cutter borne upon such carrier and adapted to cut all the convolutions desired in a single movement around the pipe, said cutter also having a rotary motion on its own axis, substantially as set forth.

3. The combination, with a support for holding the pipe, of a rotating carrier moving around the pipe, a cutter mounted on said carrier, and an annular gear for rotating said cutter on its own axis, substantially as set forth.

4. The combination, with a support for holding the pipe, of a rotating carrier moving around the pipe, a cutter mounted on said carrier, and an annular gear supported upon the carrier and serving to rotate said cutter on its own axis, substantially as set forth.

5. The combination, with a support for holding the pipe, of a rotating carrier moving around the pipe, a rotating cutter mounted on said carrier, and an annular gear actuating said cutter and supported upon the carrier and having a rotary movement independent of that of the carrier, substantially as set forth.

6. The combination, with a support for holding the pipe, of a rotating carrier moving around the pipe, a rotating cutter mounted on said carrier, a rotating annular gear, and a clutch and gearing for carrying motion from said gear to said cutter, substantially as set forth.

7. The combination, with a pipe-supporting device, of a rotating carrier moving around the pipe in a spiral path, a rotating cutter mounted on said carrier, and a worm for driving the carrier, said worm being shiftable to accommodate the spiral travel of the carrier, substantially as set forth.

8. In a screw-cutting machine, the combination of a carrier moving around the article to be milled in a spiral path, a rotating cutter borne on said carrier, an annular gear also borne upon the carrier and actuating the cutter, a gear meshing with and driving said annular gear, and a worm for actuating the carrier, substantially as set forth.

9. The combination, with the rotating tool, the tool-carrier moving in a spiral path, and the rotating annular gear for driving the tool, of a shiftable worm for actuating the carrier and a shiftable gear for actuating the annular gear, substantially as set forth.

10. The combination, with the cutter and its carrier, of the annular gear having both interior and exterior teeth, supports engaging said gear at the side, a driven gear meshing with one side of said annular gear, and a gear taking motion from the other side of said gear to be transmitted to the cutter, substantially as set forth.

11. In a screw-cutting machine, a rotating tool-carrier moving around the pipe to be cut and provided with a threaded ring 12, in combination with the frame B, having ring 13, substantially as set forth.

12. In a screw-cutting machine, a tool-carrier moving around the pipe to be cut and provided with a threaded bearing and a rotating cutter mounted on said carrier, in combination with a worm for driving the carrier and a rotating annular gear and the clutch and train of gears for driving the cutter, substantially as set forth.

13. The combination, with the carrier having the teeth 11 and moving in a spiral path, of shifting worm 10, having supports allowing it to shift with the carrier, substantially as set forth.

14. The combination, with the carrier, of the worm actuating said carrier and supports for said worm, adapted to be lifted to terminate the engagement between the worm and the carrier, substantially as set forth.

15. The combination, with a carrier moving around the pipe, of a rotating tool mounted in a swinging frame borne upon said carrier, said frame being adjustable and adapted to be locked in position, substantially as set forth.

16. The combination, with a carrier moving around the pipe, of a rotating tool mounted in a swinging frame borne upon said carrier, said frame being adapted to be locked in position, substantially as set forth.

17. The combination, with a carrier moving around the pipe, of a rotating tool mounted in a swinging frame borne upon said carrier, said frame being adjustable, substantially as set forth.

CONRAD ROSINE.

Witnesses:
H. M. MUNDAY,
EMMA HACK.